United States Patent
Ng et al.

(10) Patent No.: US 8,462,003 B2
(45) Date of Patent: Jun. 11, 2013

(54) TRANSMITTING AND RECEIVING DIGITAL AND ANALOG SIGNALS ACROSS AN ISOLATOR

(75) Inventors: Gek Yong Ng, Singapore (SG); Richard Kok Keong Lum, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 346 days.

(21) Appl. No.: 12/886,672

(22) Filed: Sep. 21, 2010

(65) Prior Publication Data

US 2012/0068614 A1    Mar. 22, 2012

(51) Int. Cl.
  *G08B 21/00*  (2006.01)
(52) U.S. Cl.
  USPC .......................... 340/635; 363/16
(58) Field of Classification Search
  USPC .......................... 340/635; 363/16
  See application file for complete search history.

(56) References Cited

U.S. PATENT DOCUMENTS

| | | | |
|---|---|---|---|
| 5,237,310 A | | 8/1993 | Smith |
| 6,225,927 B1* | | 5/2001 | Scott et al. .................. 341/110 |
| 6,389,063 B1 | | 5/2002 | Kanekawa et al. |
| 7,009,534 B2 | | 3/2006 | Nachamiev et al. |
| 7,571,063 B2 | | 8/2009 | Howell et al. |
| 7,701,731 B2 | | 4/2010 | Dhuyvetter et al. |
| 7,864,546 B2* | | 1/2011 | Dhuyvetter et al. ........... 363/17 |
| 7,920,010 B2 | | 4/2011 | Chen et al. |
| 8,289,011 B2 | | 10/2012 | Vigelius |
| 2011/0019446 A1 | | 1/2011 | Wu et al. |

FOREIGN PATENT DOCUMENTS

EP    1715586    10/2006

OTHER PUBLICATIONS

HCNR200 and HCNR201 High-Linearity Optocouplera, Avago Technologies, Nov. 18, 2008.
40 ns Propagation Delay, CMOS Optocoupler, Avago Technologies, Jun. 10, 2008.
"Quad-Channel, 2.5 Kv isolators With Integrated DC-To-DC Converter", *Amtel Corporation, 2005* 2005.
"Watchdog IC ATA6025", *Amtel Corporation, 2005* 2005.
Chen, Baoxing et al., "High Speed Digital Isolators Using Microscale On-Chip Transformers", *Elektronik Magazine* Jul. 22, 2003 , 1-6.
Hatzidakis, et al., "Multichannel Data Transmission Through A Fiber Optic Cable", URL://hdl.handle.net/10945/22375> 1987, 1-105.

* cited by examiner

Primary Examiner — Travis Hunnings

(57) ABSTRACT

Various embodiments of systems for transmitting and receiving digital and analog signals across a single isolator, solid state lighting systems, and DC/DC converter feedback regulation control systems are disclosed. At least some of the circuits, systems and methods disclosed herein may be implemented using conventional CMOS design and manufacturing techniques and processes to provide, for example, a single integrated circuit or ASIC.

38 Claims, 9 Drawing Sheets

TRANSMITTING AND RECEIVING DIGITAL AND ANALOG SIGNALS ACROSS AN ISOLATOR

FIELD OF THE INVENTION

Various embodiments of the inventions described herein relate to the field of isolators, such as galvanic isolators, and components, devices, systems and methods associated therewith.

BACKGROUND

In an isolated communication system where both analog and digital signals are transmitted across an isolation barrier, two isolation channels are typically required to transmit the two different types of signals across the barrier. Such an isolated communication system is shown in FIG. 1, where input analog signal 10 in isolated communication system 5 is transmitted by transmitter 12 across analog isolator 14 for reception by receiver 16, which in turn generates output analog signal 18, and where input digital signal 20 is transmitted by transmitter 22 across digital isolator 24 for reception by receiver 26, which in turn generates output digital signal 28. The requirement for two different types of isolators in such a system 5 adds to cost. Furthermore, in some cases it is not feasible to employ two isolators in an integrated circuit package due to space constraints.

What is need is an isolated communication system where analog and digital signals can be transmitted and received through a single isolation channel.

SUMMARY

In some embodiments, there is provided a system for transmitting and receiving digital and analog signals across an isolator, comprising a modulator, a transmitter operably connected to the modulator, a signal isolator operably connected to the modulator, a receiver operably connected to the isolator, a frequency discriminator operably connected to the receiver, and a filtering circuit operably connected to the receiver, wherein the modulator is configured to accept as inputs thereto an analog signal and a first digital signal having a first frequency, and the modulator is further configured to modulate the analog signal according to the first frequency and corresponding logic state of the first digital signal to form a frequency-modulated (FM) signal as an output therefrom to the transmitter, the transmitter being configured to encode and transmit the FM signal to the isolator for conveyance thereacross to the receiver as an input thereto, the receiver providing the received FM signal to the frequency discriminator and the filtering circuit, the frequency discriminator being configured to decode the FM signal and provide a reconstructed first digital signal as an output therefrom, the filtering circuit being configured to filter the FM signal and provide the analog signal as an output therefrom.

In other embodiments, there is provided a solid state lighting system comprising, an AC/DC rectification circuit operably connectable to a source of AC voltage as an input thereto, and configured to provide a rectified DC output voltage, an isolation transformer comprising a switched mode power supply (SMPS) controller, the transformer being configured to receive the rectified DC output voltage as an input thereto and to provide an isolated DC output voltage therefrom, a lighting circuit comprising at least first and second pluralities of LEDs connected in series and driven by the isolated DC output voltage, a current sensing circuit being operably connected to a current sensing node in the lighting circuit and configured to provide a sensed current signal as an output therefrom, a voltage sensing circuit arranged in parallel with respect to the lighting circuit and comprising a voltage sensing node disposed between first and second resistors of a voltage dividing network, the voltage monitoring circuit being configured to provide a voltage monitoring signal as an output therefrom through the voltage sensing node, a first comparator configured to receive as inputs thereto the voltage monitoring signal and a first reference voltage, the first comparator being configured to generate a fault state output signal when the voltage monitoring signal exceeds or falls below a predetermined threshold, a triangle wave generator circuit having as an input thereto the output signal of the first comparator, the triangle wave generator being configured to generate a triangle wave output signal having a first frequency when an output signal corresponding to the fault state is received thereby, and a triangle wave signal having a second frequency when the fault state output signal is not received thereby, a second comparator configured to receive as inputs thereto the triangle wave output signal and the sensed current signal, the second comparator being configured to generate a modulated output signal comprising the sensed current signal and the triangle wave output signal, and an optical isolator circuit configured to receive as an input thereto the modulated output signal, the isolator comprising an LED driver operably connected to the output of second comparator, the LED driver providing optical output signals, the isolator further comprising a photodetector configured to generate current in response to the LED driver providing the optical output signals thereto.

In further embodiments, there is provided a DC/DC converter feedback regulation control system comprising a DC/DC converter configured to receive a first DC input voltage and to provide a regulated second DC output voltage, an isolation transformer comprising a switched mode power supply (SMPS) controller, the transformer being configured to receive the second DC voltage as an input thereto and to provide an isolated DC output voltage therefrom, a load circuit driven by the isolated DC output voltage, a current fault generation circuit being operably connected to a current sensing node in the load circuit and configured to provide a current fault signal as an output therefrom through the current sensing node when the sensed current falls below or exceeds a first predetermined threshold, a voltage sensing circuit arranged in parallel with respect to the load circuit and comprising voltage sensing and feedback nodes disposed between first and second resistors of a voltage dividing network, the voltage monitoring circuit being configured to provide voltage monitoring and feedback signals as outputs therefrom through the voltage sensing and feedback nodes, respectively, a first comparator configured to receive as inputs thereto the voltage monitoring signal and a first reference voltage, the first comparator being configured to generate a voltage fault state output signal when the voltage monitoring signal exceeds a predetermined threshold, a triangle wave generator circuit having as inputs thereto the output signal of the first comparator and the current sensing node, the triangle wave generator being configured to generate a triangle wave output signal having a first frequency when an output signal corresponding to no voltage or current fault state is received thereby, a triangle wave signal having a second frequency when the voltage fault state output signal is received thereby, and a triangle wave signal having a third frequency when the current fault state output signal is received thereby, a second comparator configured to receive as inputs thereto the triangle wave output signal and the voltage feedback signal, the second comparator being configured to generate a modulated output signal comprising the triangle wave output signal and the voltage feedback signal, and an optical isolator circuit configured to receive as an input thereto the modulated output signal, the isolator comprising an LED driver operably connected to the output of second comparator, the LED driver providing optical output signals, the isolator further comprising a photodetector configured to generate current in response to the LED driver providing the optical output signals thereto.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

Figure 1:
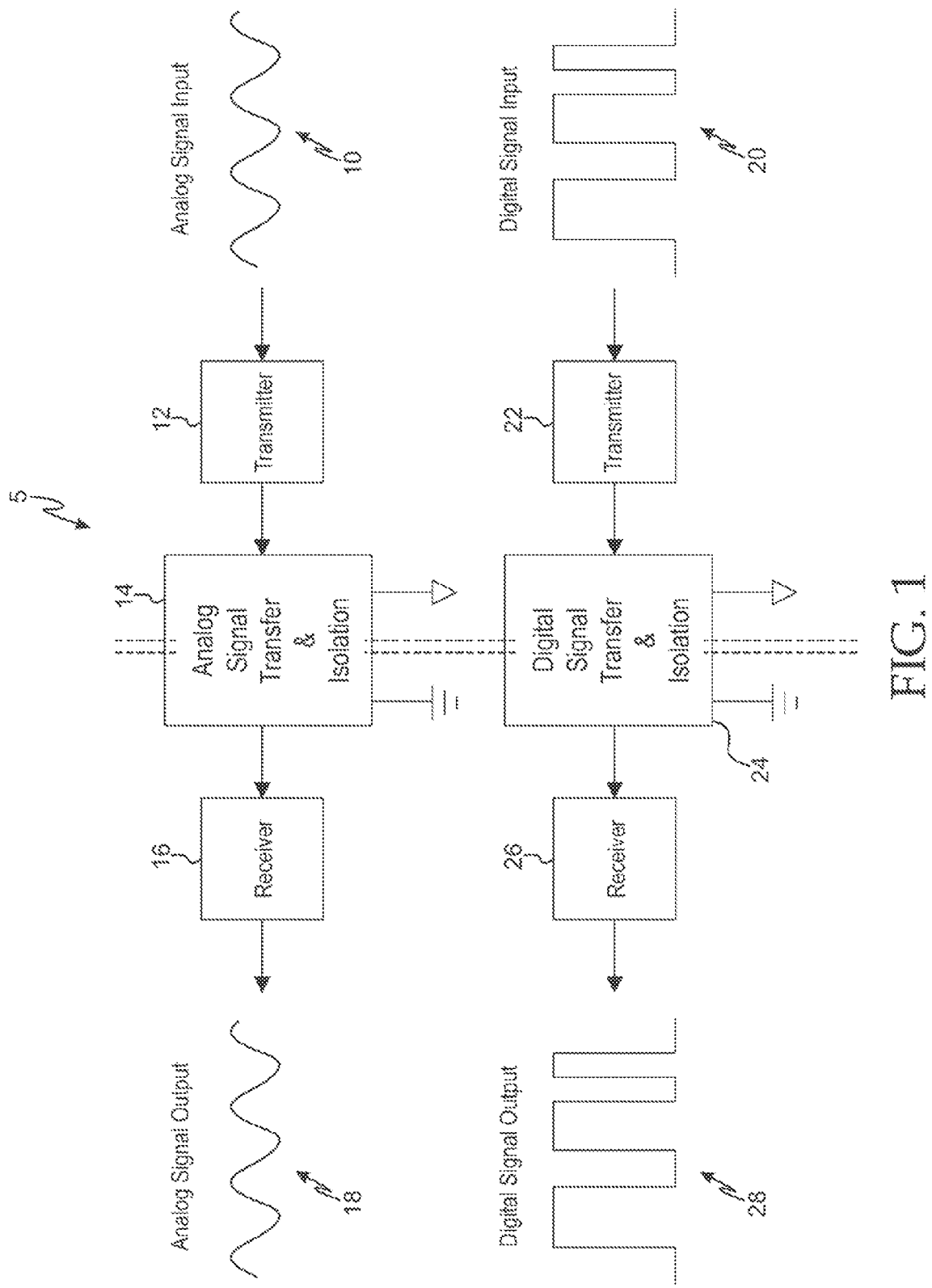
FIG. 1 shows an isolated communication system of the prior art.
Figure 2:
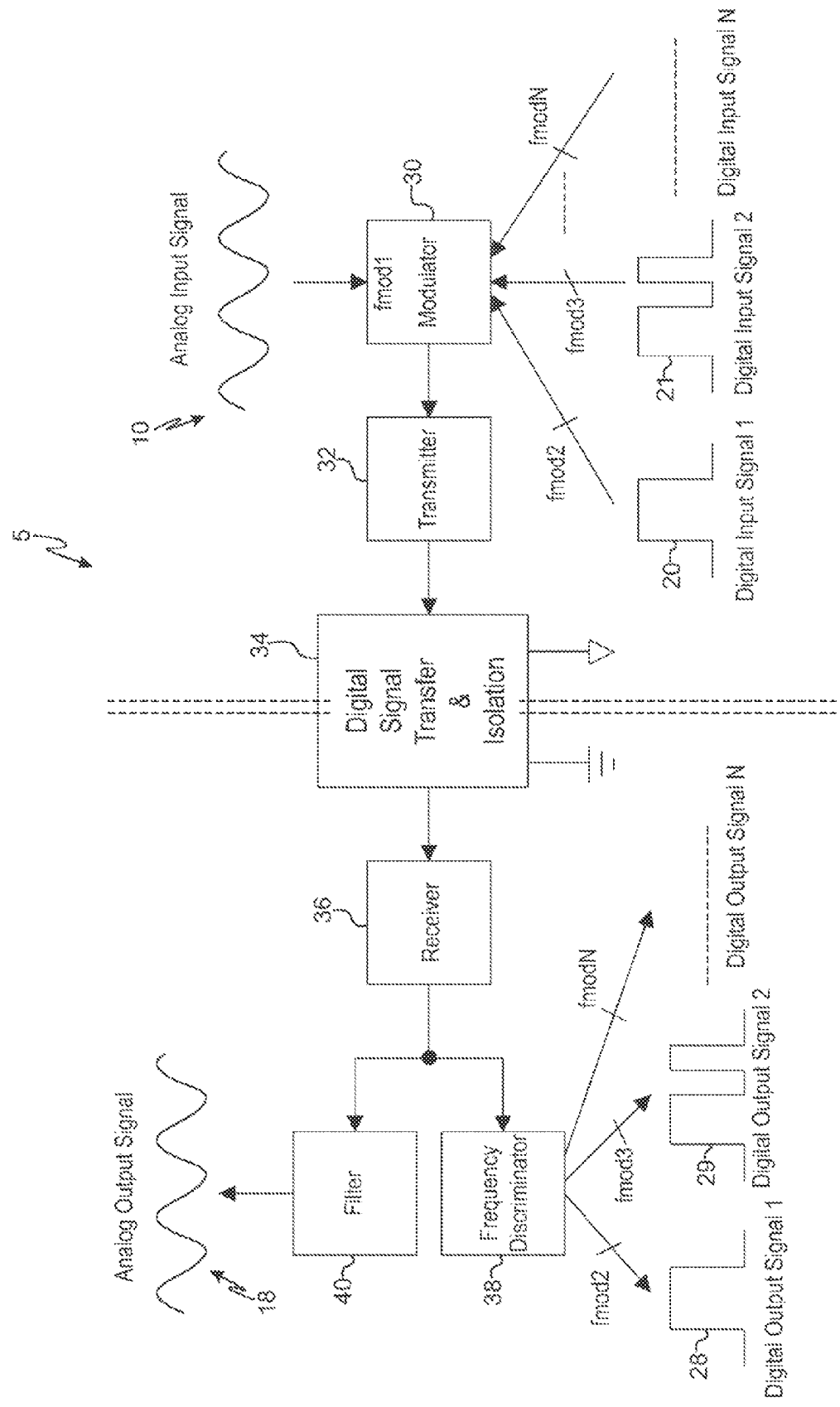
FIG. 2 shows a block diagram of one embodiment of an isolated communication system.

FIG. 2 shows a block diagram of one embodiment of an isolated communication system 5, which employs a single digital isolator for transmitting and receiving both analog and digital signals. Analog signal 10 is converted into a digital signal by modulator 30, which modulates analog signal 10 at a first frequency fmod1. This modulation frequency can be changed according to the status of one or more of digital input signals 1, 2, . . . N.

In a situation where only one digital signal is to be sent across isolation barrier 34, when digital input signal input 1 (or 20) is at a logic low level, the modulation frequency remains at fmod1. Analog input signal 10 is then modulated by modulator 30 in accordance with a digital signal having a frequency of fmod1. If digital input signal input 1 (or 20) changes to a logic high level, the modulation frequency is changed by modulator 30 to a second frequency fmod2. Analog input signal 10 is then modulated in accordance with the second frequency fmod2. In such a manner, digital input signal 1 is embedded into analog input signal 10, which is translated to a frequency modulated (FM) signal. This FM signal is routed through transmitter 32 and sent through digital isolator or barrier 34. On the other side of isolator 34, receiver 36 receives the transmitted signal, which is then filtered to recover the analog signal to generate analog output signal 18. At the same time, the received signal is also routed through frequency discriminator 38 to detect and recover the embedded digital signal.

In general, more than one digital signal input may be transmitted through digital isolator or barrier 34, in which case the modulation frequency is changed by modulator 30 according to the state of each of the transmitted digital signals. For successful decoding of analog and digital signals, frequencies fmod1, fmod2, . . . , fmodN should all be selected to lie outside the passband of filter 40. In addition, frequencies fmod1, fmod2, . . . , fmodN should be sufficiently well separated from one another such that frequency discriminator 38 can distinguish between the various frequencies.

Figure 3:
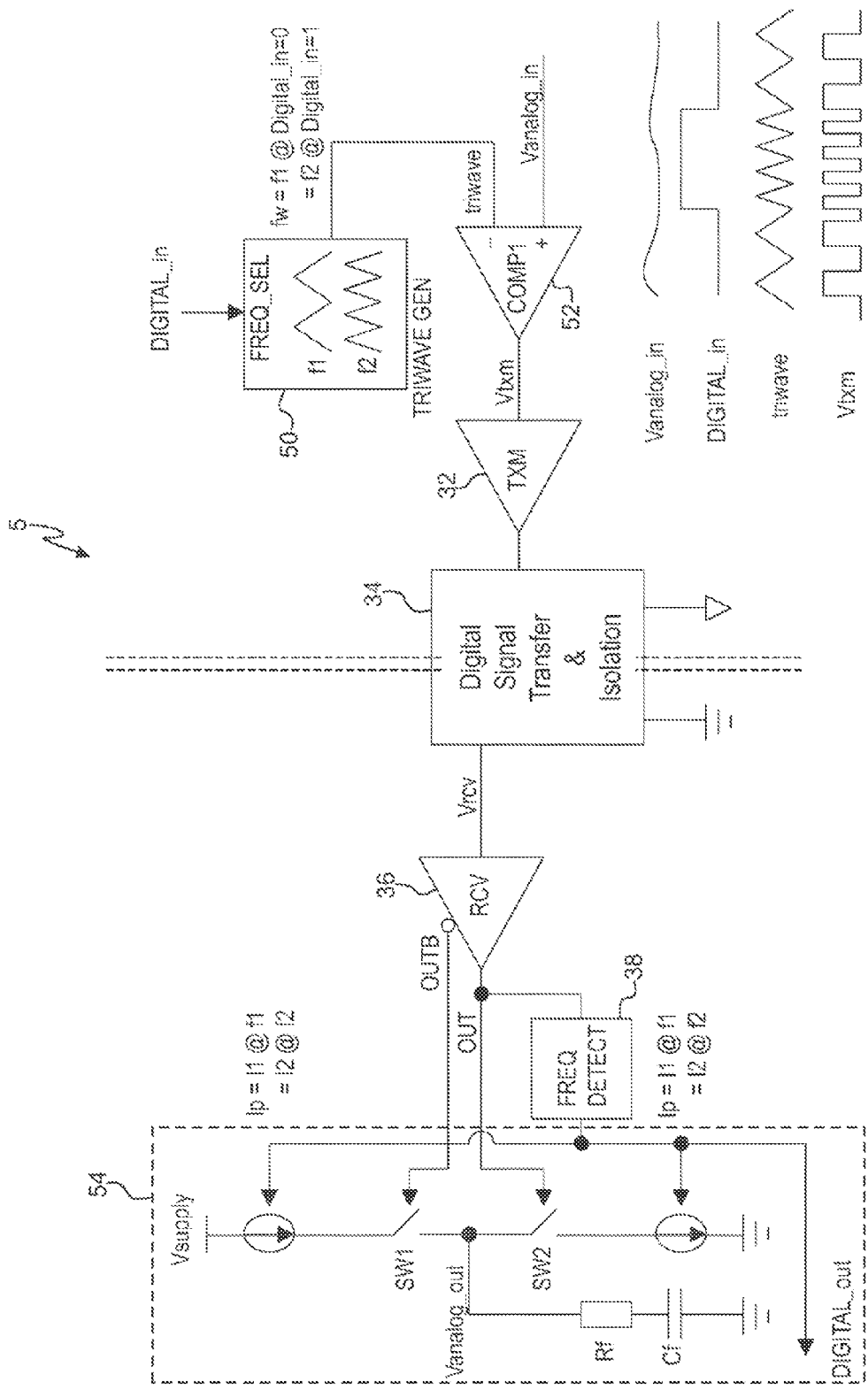
FIG. 3 shows a block diagram of another embodiment of an isolated communication system.

FIG. 3 shows a block diagram of another embodiment of an isolated communication system 5. FIG. 3 shows one embodiment of circuitry configured to multiplex the analog and digital input signals through a single digital isolator or barrier 34. The analog input signal, Vanalog_in, is connected to the positive input of comparator COMP1 (or 52). The negative input signal of COMP1 is connected to the output of triangle wave generator TRIWAVE GEN 50. The digital input signal DIGITAL_in controls the FREQ_SEL input of TRIWAVE GEN 50, which determines the frequency of the triangle wave output provided thereby. When DIGITAL_in is at logic low, the triangle wave oscillates at a first frequency f1. When digital input signal DIGITAL_in is in a logic high state, the triangle wave oscillates at a second frequency f2. The waveforms at the various nodes indicated in the lower right-hand portion of FIG. 3 show the effect of modulation on the output signal Vtxm transmitted by COMP1. On the receiving side, the receiver replicates the transmitted signal at its output, and this output is then used to control switches SW1 and SW2 of charge pump circuit 54. For example, when signal OUT provided by receiver 36 is in a low state and signal OUTB is in a high state, SW1 turns on and charges the RC loop filter, which comprises resistor Rf and capacitor Cf. When signal OUT is in a high state and signal OUTB is in a low state, SW2 turns on and discharges the RC loop filter. The rate of turning on and off of switches SW1 and SW2 thus depends on the frequency of the received signal Vrcv. The charge pump current Ip provided by charge pump current 54 also depends on the frequency of Vrcv. When Vrcv switches at frequency f1, charge pump circuit 54 switches at a rate of f1 with a current of I1. When Vrcv switches at frequency f2, charge pump circuit 54 switches at a rate of f1 with a current of I2. The relationship between the charge pump current Ip and the switching frequency is such that when f2=A·f1, then I2=A·I1. This ensures that the charge pump current Ip is scaled such that the charging or discharging time constant associated therewith is not affected by a change in the switching frequency, and thus the characteristics of the output analog signal, Vanalog_out, are preserved. This ensures that loop dynamics and system behaviour are not modified. The filtered analog signal Vanalog_out therefore represents faithfully the original analog input signal, Vanalog_in, which is preserved and reproduced regardless of additional modulation provided by the embedded digital signal. To recover the embedded digital signal, the receiver output is provided to frequency detector FREQ DETECT 38, which discriminates between frequencies f1 and f2 and reproduces the input digital signal DIGITAL_in as output digital signal DIGITAL_out.

Figure 4:
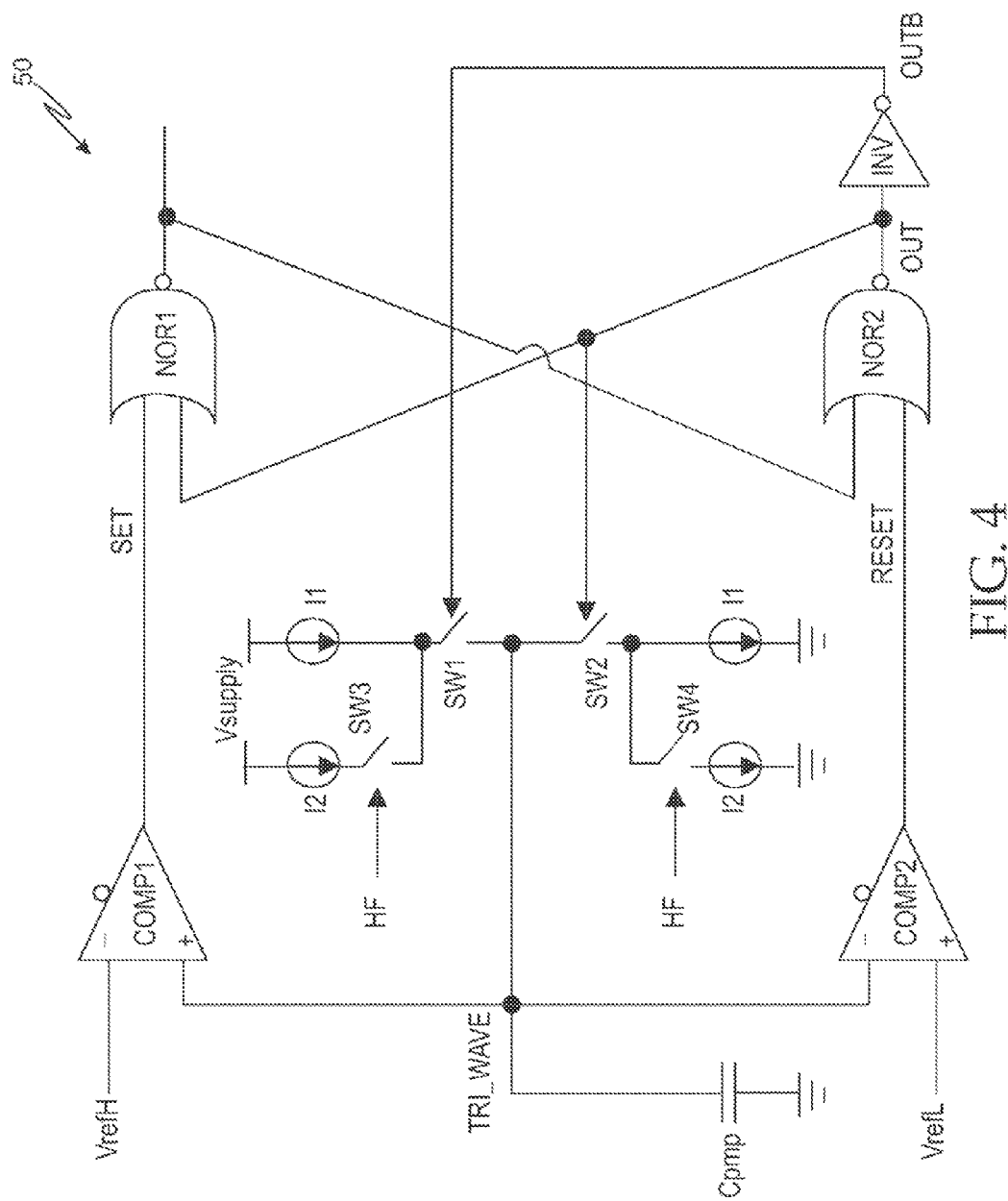
FIG. 4 shows one embodiment of circuitry corresponding to circuit TRIWAVE GEN 50 of FIG. 3.
Figure 5:
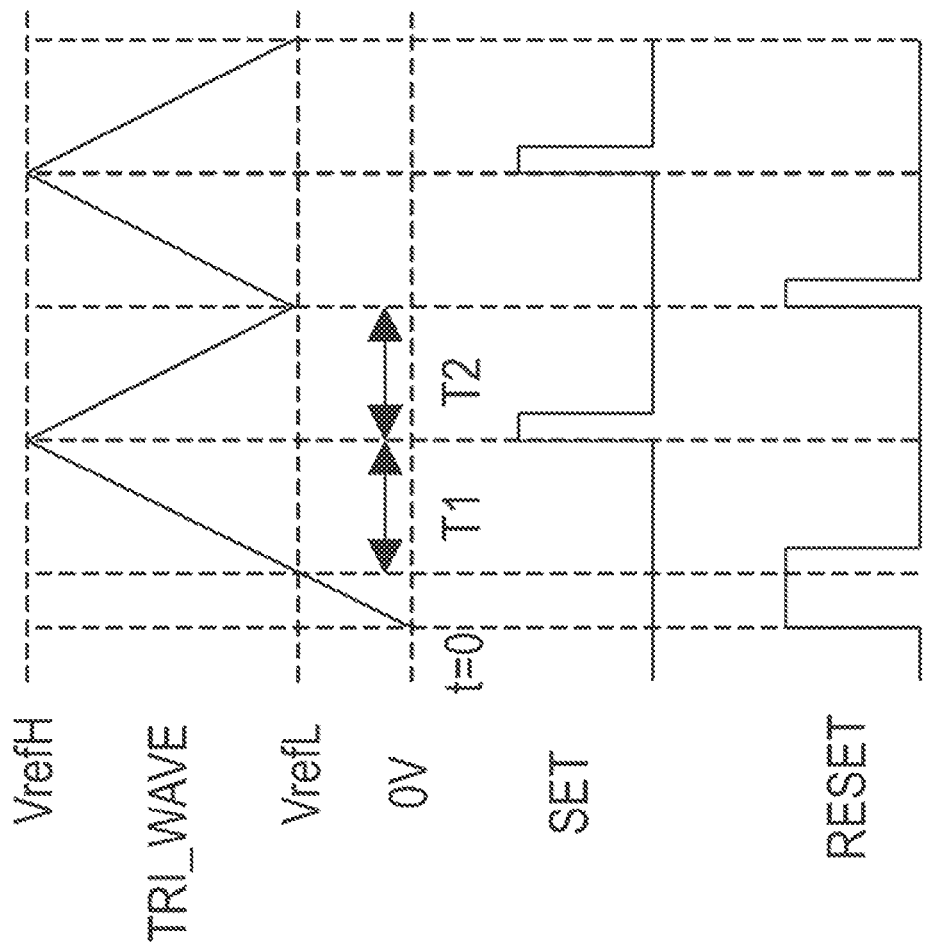
FIG. 5 shows waveforms generated at various nodes of the circuitry of FIG. 4.

FIG. 4 shows one embodiment of circuitry corresponding to circuit TRIWAVE GEN 50 of FIG. 3. Note that other embodiments of circuitry for TRIWAVE GEN 50 are contemplated, in addition to that shown in FIG. 4. FIG. 5 shows waveforms generated at various nodes of the circuitry of FIG.

4. The triangle wave generator circuit of FIG. 4 comprises two comparators, a charge pump circuit and an RS latch. Circuit 50 of FIG. 4 generates an output signal TRI_WAVE, which is a triangle wave with a peak-to-peak voltage level extending between VrefL and VrefH. These two reference levels, VrefL and VrefH, are the threshold voltages corresponding to the two comparators. At time t=0, and assuming the capacitor Cpmp starts up with zero charge, RESET goes high causing OUT to go low and OUTB to go high. Switch SW1 then turns on and SW2 turns off. The charge pump sources current into Cpmp and so circuit TRI_WAVE 50 charges up at a rate determined by the source current and Cpmp. As circuit TRI_WAVE 50 charges up and reaches VrefH, SET goes high causing OUT to go high and OUTB to go low. Switch SW1 then turns off and SW2 turns on. The charge pump sinks current from Cpmp and so circuit TRI_WAVE 50 discharges at a rate determined by the sink current and Cpmp. As shown in FIG. 5, if the source and sink currents have the same value I1, then the charge and discharge times are the same, which is given by:

$$T1=T2=(VrefH-VrefL)*Cpmp/I1 \qquad (eq. 1)$$

To change the frequency of the triangle wave, such as for example to a higher frequency, control signal HF controlling switches SW3 and SW4 can be set high. This turns on both SW3 and SW4, and increases both the source and the sink currents of the charge pump. As a result, the capacitor Cpmp charges and discharges faster, and circuit TRI_WAVE 50 then oscillates between the two levels VrefL and VrefL at a higher rate.

In some embodiments directed to solid state lighting applications, light emitting diodes (LEDs) are used as a light source, a linear optocoupler is used for optical isolation, and linear feedback control of the LED current is employed to precisely control the LED current. In the event of LED failure, however, such information typically is not fed back to a controller to report a fault condition so that the system can be shut down to save power and the faulty LED can be replaced. In the case of LEDs connected in a series stack, such a result can lead to degradation of luminous intensity or uneven luminosity in the array of LEDs. This problem may be addressed by multiplexing isolated signal sensing in combination with fault feedback through a single optocoupler. Such a system can therefore react and respond appropriately to a fault condition. For example, a controller can be configured to shut down the system to save power until the faulty LED bulb is replaced.

Figure 6:
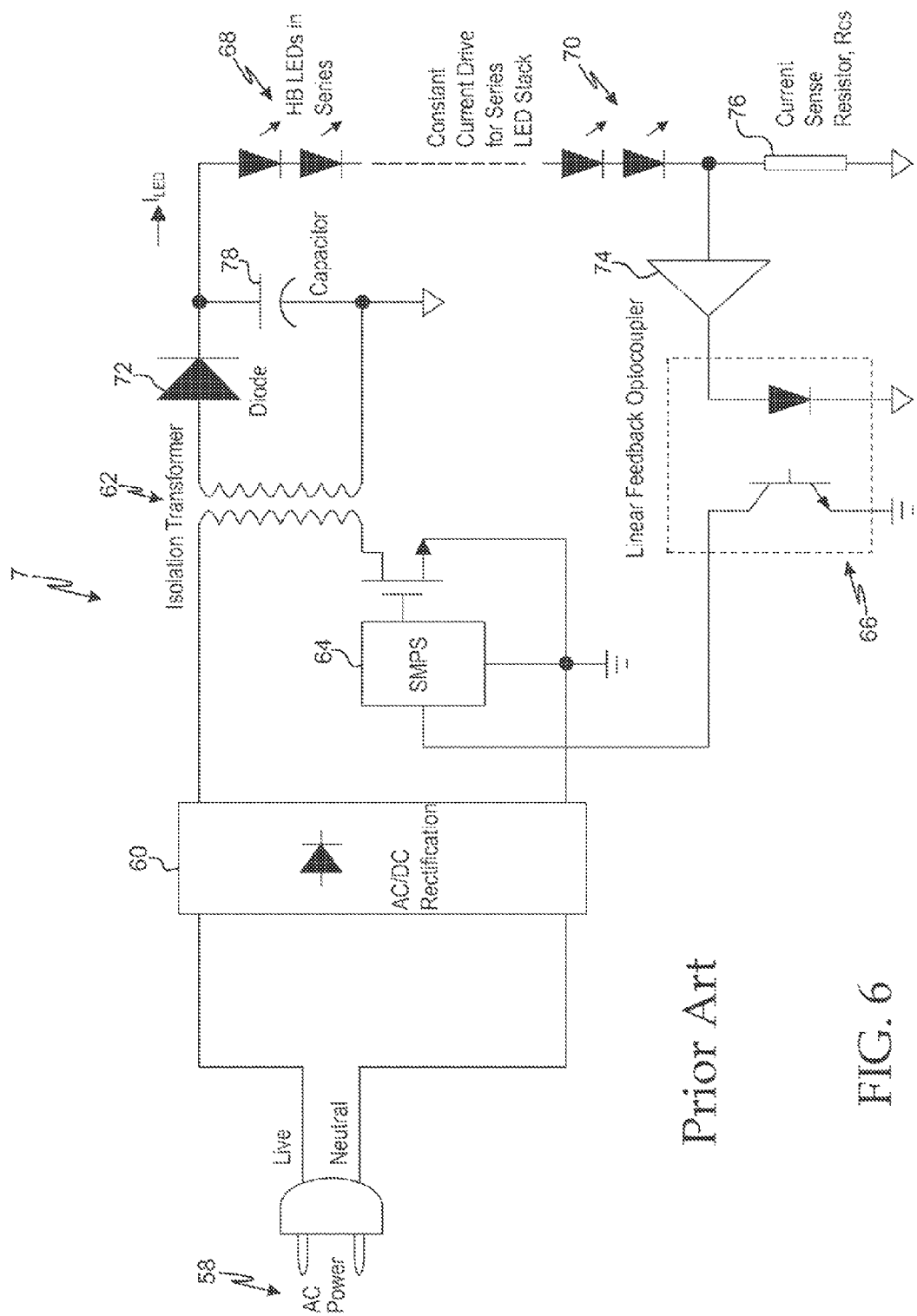
FIG. 6 shows one prior art implementation of a solid state lighting system.

FIG. 6 shows one prior art implementation of a solid state lighting system 7 which employs analog linear signal feedback, but which is not capable of providing fault sensing and feedback through linear feedback optocoupler 66. System 7 of FIG. 6 comprises a power generation circuit, LEDs 68 and 70 in a series stack, and linear feedback optocoupler 66 for loop regulation of the LED current. The power generation circuit consists of AC-to-DC rectification block 60, an isolated flyback converter comprising switched mode power supply (SMPS) controller 64, transformer 62, diode 72 and output capacitor 78. LEDs 68 and 70 are usually connected in a series stack so that a constant current flows through all the LEDs to provide a constant level of brightness. The LED current develops a voltage drop across current sense resistor Rcs. The resulting analog voltage level is sensed through linear feedback optocoupler 66 and provided to SMPS controller 64 to regulate the system response. The failure mode of any of LEDs 68 and 70 can occur as an open or short circuit, and a fault condition occurs when one or more of LEDs of LEDs 68 and 70 in the stack fail. In the undesirable situation where an LED fails by short-circuiting, the faulty bulb will continue to draw power and its loss of luminance will go undetected by system 7.

Figure 7:
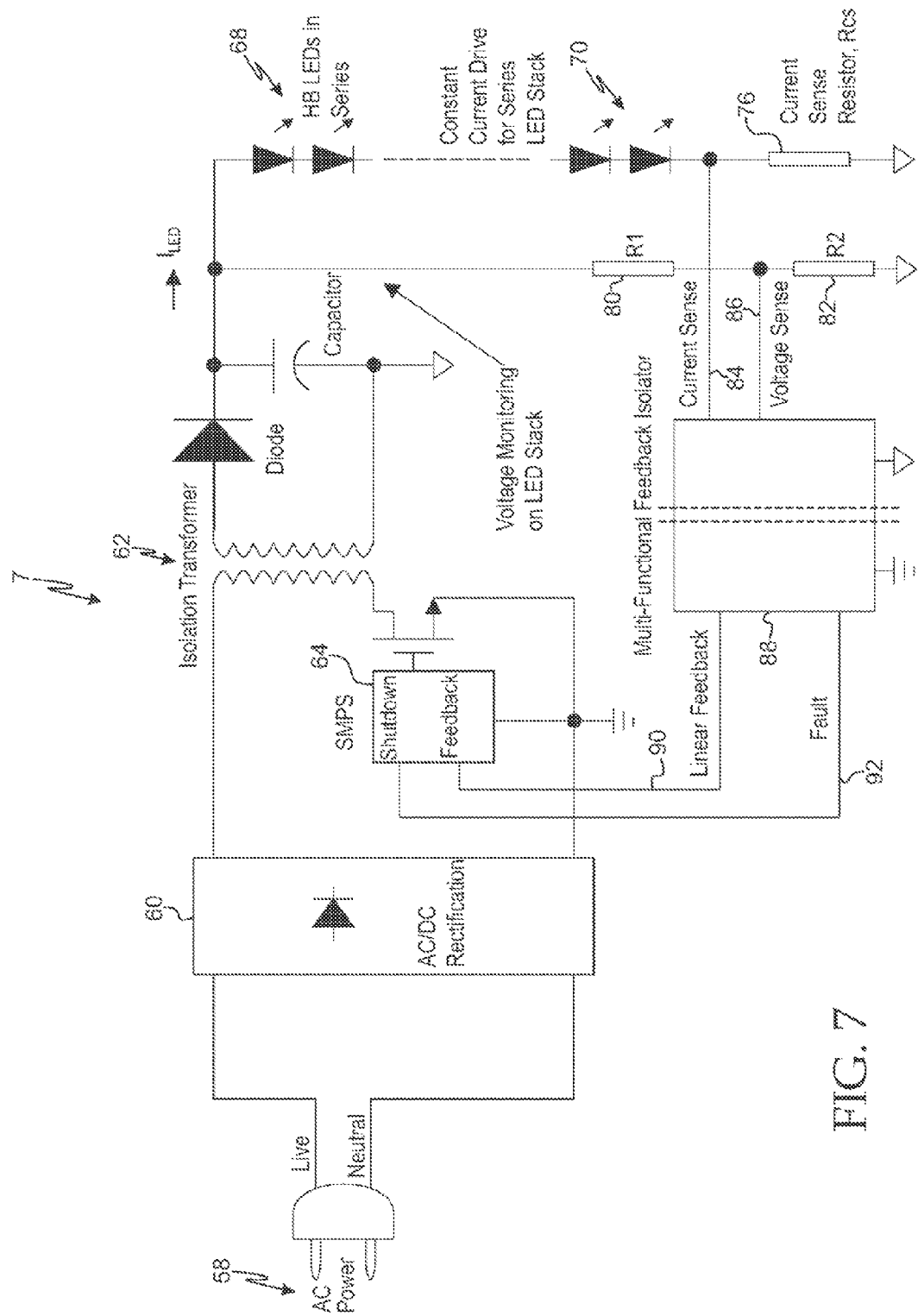
FIG. 7 shows one embodiment of a solid state lighting system 7.

FIG. 7 shows one embodiment of a solid state lighting system 7 that overcomes some of the problems of solid state lighting system 7 of FIG. 6. IN FIG. 7, system 7 incorporates linear feedback for loop control and voltage sensing for LED fault management in an isolated solid state lighting system. Compared to system 7 of FIG. 6, besides the linear feedback of the LED current level through resistor Rcs, an additional resistor divider network comprising resistors R1 and R2 provides voltage monitoring of the overall voltage of the LED stack comprising LEDs 68 and 70. Such voltage monitoring is achieved by feeding back the voltage sense level developed by the resistor divider network through multi-functional feedback isolator 88. Because the forward voltage drop of an LED is generally fairly consistent, the total forward voltage drop of a series stack of LEDs can be determined and regulated by the feedback loop. If a fault condition occurs, where for example one or more LEDs 68 and 70 fails by short-circuiting, a drop in the voltage sense level is detected and fed back to switched mode power supply (SMPS) controller 64. In such a manner, system 7 shown in FIG. 7 is configured to provide LED fault information to controller 64 so that system 7 can be shut down to conserve power until the fault condition can be remedied.

Figure 8:
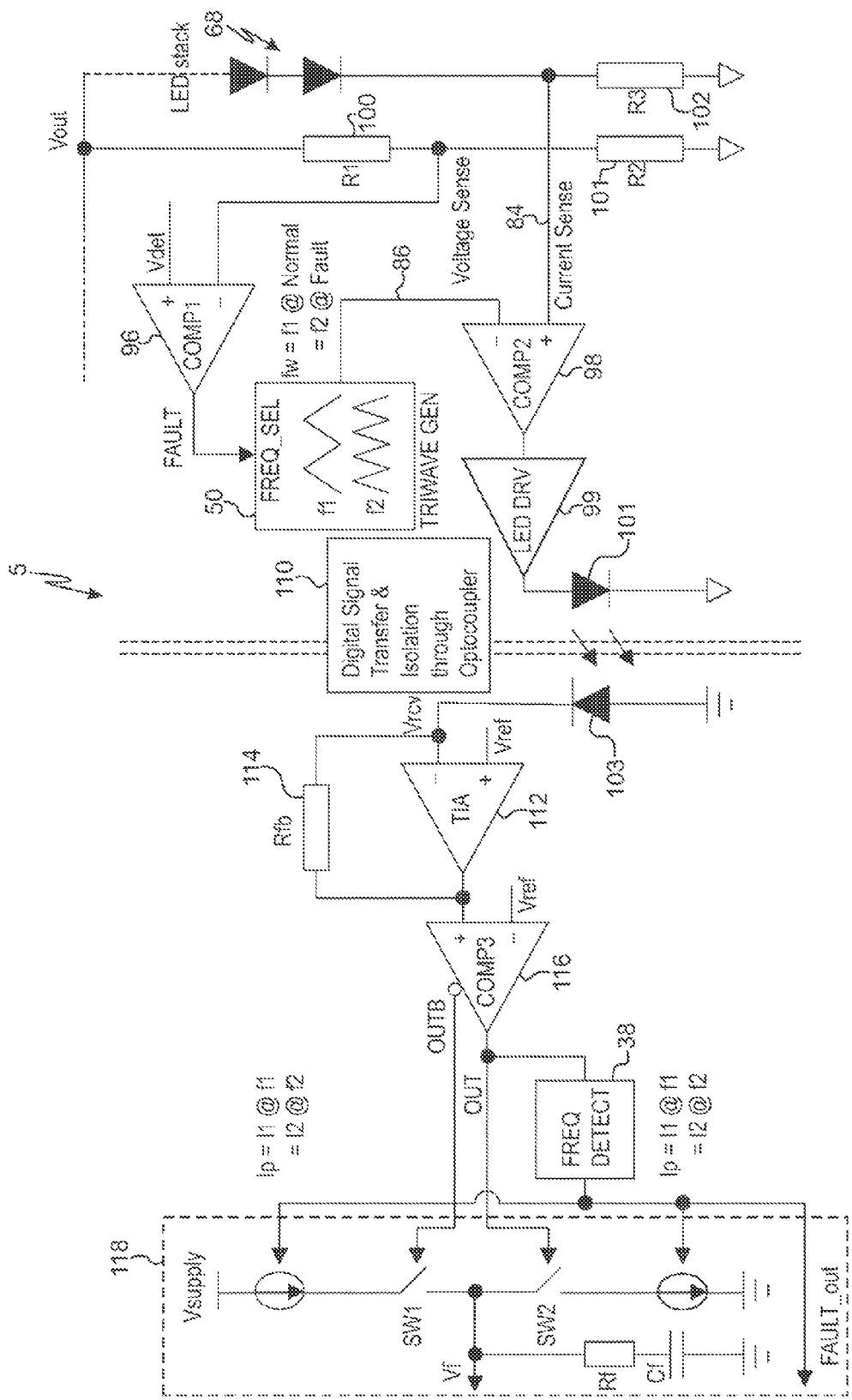
FIG. 8 shows one embodiment of circuitry configured to multiplex linear signal feedback with fault sensing through a single optocoupler in an isolated solid state lighting system.

FIG. 8 shows one embodiment of circuitry configured to multiplex linear signal feedback with fault sensing through a single optocoupler in an isolated solid state lighting system. The functional blocks to monitor the LED current and voltage levels comprise a first comparator COMP1 (96) to monitor the voltage sense level, a second comparator COMP2 (98) to detect the current sense level, and a triangle wave generator circuit TRIWAVE GEN 50, which outputs a triangle wave with a frequency determined by the FAULT input. Comparator COMP1 (96) has its positive input connected to a reference voltage Vdet and its negative input connected to the LED voltage sense level. The voltage sense level is determined by the ratio set by the resistor divider network comprising resistors R1 and R2. When LED stack comprising LEDS 68 is operating normally, the voltage sense level is designed to be higher than the LED under-voltage reference level Vdet by less than the forward voltage drop of a LED. Hence, the status of the FAULT signal which is provided by the output of COMP1 (96) is in a low state under normal operating conditions. The FAULT signal controls the frequency selection pin FREQ_SEL of circuit TRIWAVE GEN 50. When FAULT is in a low state, the triangle wave frequency generated oscillates at a first frequency f1. This triangle wave is then connected to the negative input of the second comparator COMP2 (98), which has its positive input connected to the LED current sense level. As a result, the current sense level is modulated by the triangle wave and is converted to a digital format at the output of COMP2 (98). The output of COMP2 (98) produces a pulse-width-modulated digital signal having a duty cycle representing the analog current sense level. The frequency of this pulse-width-modulated signal is the same as that of the triangle wave. In the event of an LED failure, when for example one or more LEDs in stack 68 fail by short-circuiting, the voltage sense level drops below its normal level, and triggers comparator COMP1 (96) to cross the Vdet threshold and to register a high state with respect to the FAULT status. FREQ_SEL is then driven high and causes the triangle wave frequency to switch to a second frequency f2. As a result, the pulse-width-modulated signal provided at the output of COMP2 (98) has its frequency switched to f2. The duty cycle of the output signal provided by COMP2 (98) remains the same as in the case of normal operation, however, because the current sense level, which is a product of the LED current through LED stack 68 and resistor R3, is not affected by the drop in the LED stack voltage. The output of COMP2 (98) is then provided to LED driver LED DRV 99, which turns LED 101 connected to its output on or off depending on whether the output of COMP2 (98) is high or low.

On the receiving side, photodiode 103 is turned on when light generated by LED 101 is in the on state shines thereon. The photodiode current provided by photodiode 103 is detected by transimpedance amplifier TIA 112 having its negative input connected to photodiode 103. The photodiode current flows through the TIA feedback resistor Rfb, which is translated into a voltage signal at the output of TIA 112. Thus, TIA 112 outputs a delayed version of the exact data pattern received from the transmitting side. When the output voltage level of TIA 112 is larger than the comparator COMP3 (116) reference level Vref connected at its negative input, the output of COMP3 116 switches to the logic high level. The outputs of COMP3 116 are used to control switches SW1 and SW2 of charge pump circuit 118. For example, when OUT of COMP3 116 is in the low state and OUTB of COMP3 (116) is in the high state, SW1 turns on and charges the RC loop filter, which comprises resistor Rf and capacitor Cf. When OUT is high and OUTB is low, SW2 turns on and discharges the RC loop filter. The rate of at which switches SW1 and SW2 are turned on and off thus depends on the frequency of the received signal Vrcv. The charge pump current Ip also depends on the frequency of Vrcv. When Vrcv switches at frequency f1, charge pump circuit 118 switches at a rate f1 with a current I1. When Vrcv switches at frequency f2, charge pump circuit 118 switches at a rate f2 with a current of I2. The relationship between the charge pump current I1 and the switching frequency is such that when f2=A·f1, I2=A·I1. This ensures that charge pump current I1 is scaled such that the charge or discharge time constant associated therewith is not affected by a change in the switching frequency. Thus, the characteristics of the output analog signal, Vf, are preserved, and ensure that the loop dynamics and system behaviour are not modified. The filtered analog signal Vf thus represents the input analog current sense signal level, which is preserved regardless of additional modulation associated with the embedded digital signal. The Vf voltage level is then fed back to the SMPS controller to regulate the converter. To recover the embedded FAULT digital signal, the output of COMP3 (116) is provided to frequency detector FREQ DETECT 38, which discriminates between frequencies f1 and f2 to reproduce the digital signal at FAULT_out. In such a manner, the regulation and feedback loop operates as usual without being disrupted by the feedback FAULT signal. Using FAULT feedback information, however, the SMPS controller can then be configured to shut down system 7 when a failure event occurs.

Figure 9:
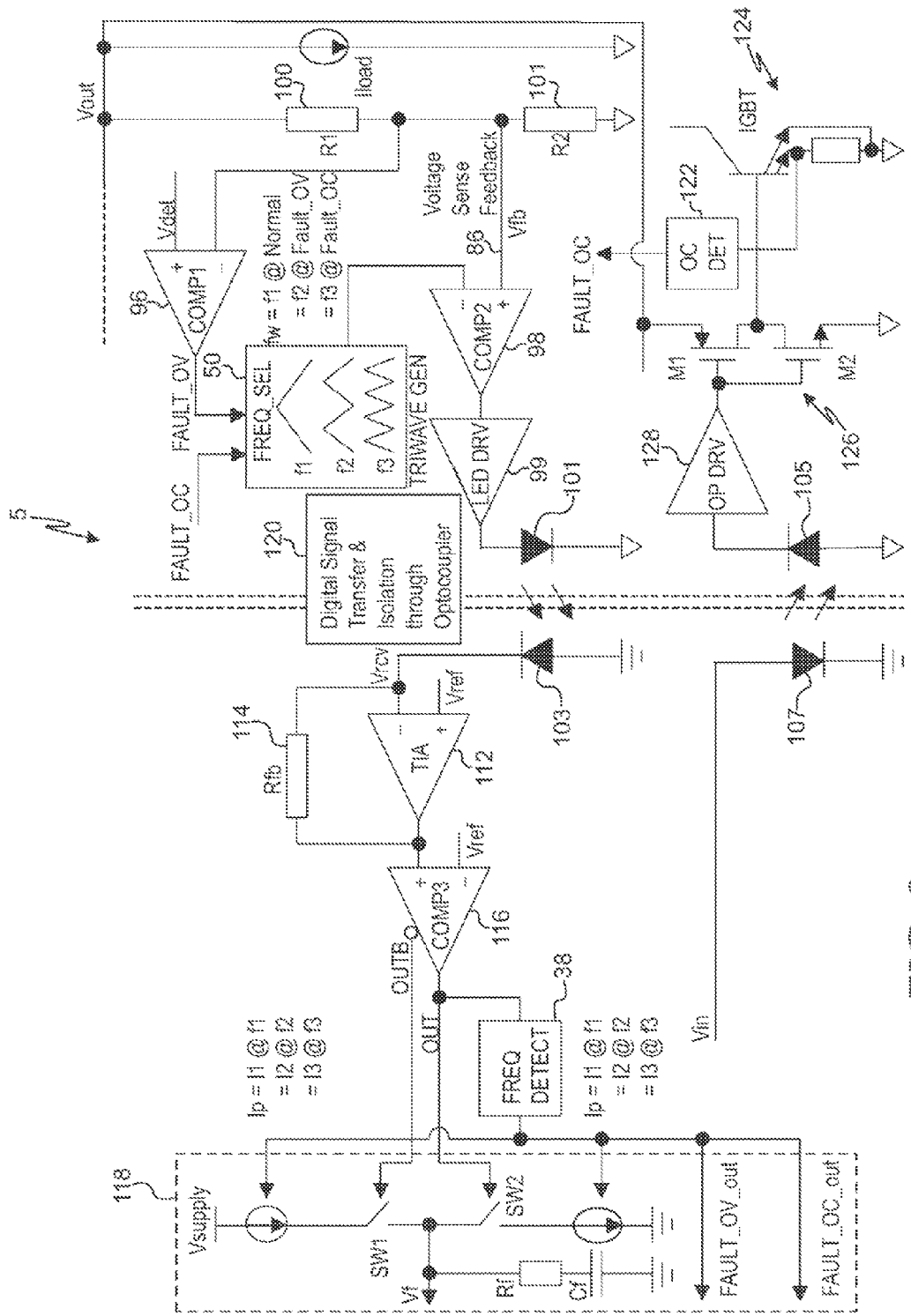
FIG. 9 shows an embodiment of an optically isolated gate driver integrated with a DC-DC converter.

FIG. 9 shows an embodiment of an optically isolated gate driver integrated with a DC-DC converter, where more than one digital feedback signal is provided together with an analog signal. In such an implementation, the output of the DC-DC converter, Vout, serves as the supply to the gate driver comprising transistors M1 and M2 (126). The output of the gate driver in turns drives the external insulated gate bipolar transistor (IGBT or 124). The regulation of the DC-DC converter loop is via a voltage sense feedback node at Vfb, which is provided by a resistor divider network comprising resistors R1 and R2. Under normal operation, circuit TRIWAVE GEN 50 outputs a triangle wave having a frequency f1, which modulates the feedback voltage Vfb into a pulse-width-modulated digital signal which appears at the output of comparator COMP2 (98). Through LED driver 99, a digitized version of the analog feedback signal Vfb is sent across by means of optical isolation to the receiving side. After going through TIA amplifier 112 and comparator COMP3 (116), and after being filtered by the action of charge pump circuit 118 and its corresponding loop filter, the digitized signal is converted back into an analog signal as analog signal Vf. Analog signal Vf is then fed back to the SMPS controller to regulate the output Vout of the converter loop. In such an embodiment, the digital input signals that are to be multiplexed with the analog input signal across isolator or barrier 120 can be configured to include two fault events. One such fault event can correspond to the detection of an over-voltage condition at the Vout voltage level, which may be provided by comparator COMP1 (96) with a threshold set at the over-voltage level, and a status provided by output FAULT_OV. Another fault can correspond to the detection of an over-current condition of IGBT 124, which may be provided by over-current detection circuit OC DET (122), and a status provided by output FAULT_OC. The two fault outputs FAULT_OV and FAULT_OC are then employed to alter the frequency at which the output of circuit TRIWAVE GEN 50 is modulated. For example, if FAULT_OV is in a high state to indicate an output over-voltage condition, the modulation frequency is switched from the normal rate of f1 to a rate of f2. If FAULT_OC is in a high state to indicate IGBT 124 is in an over-current condition, the modulation frequency is switched to a rate of f3. At the receiving end, frequency discriminator block FREQ DETECT 38 determines the presence of either of frequencies f2 and f3, or both, and updates the status of the recovered outputs FAULT_OV_out and FAULT_OC_out accordingly. In such a manner, the SMPS controller is configured to determine the best course for system 5 to follow based on such fault status feedback signals. Note that the occurrence of a fault event does not disrupt the normal operation of the DC-DC converter operation, as the digital fault signals are merely embedded in a digitized format for feedback, and the filtered output Vf represents the same analog input signal as in the normal operation mode.

The entire signal and fault feedback path of system 5 employs the use of a single digital optocoupler for signal transfer through isolator or barrier 120. This provides a significant advantage compared to using a linear optocoupler because the digital signal transfer does not suffer from LED degradation, which is a major problem in linear signal transfer. Besides using optical isolator 101/103, the embodiment shown in FIG. 9 works well with other isolation media, such as magnetic or capacitive isolators or barriers.

Included within the scope of the present invention are methods of making and having made the various components, devices and systems described herein. At least some of the circuits, systems and methods disclosed herein may be implemented using conventional CMOS design and manufacturing techniques and processes to provide, for example, a single integrated circuit or ASIC.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein nevertheless fall within the scope of the invention.

We claim:

1. A system for transmitting and receiving digital and analog signals across an isolator, comprising:
   a modulator;
   a transmitter operably connected to the modulator;
   a signal isolator operably connected to the modulator;
   a receiver operably connected to the isolator;
   a frequency discriminator operably connected to the receiver, and
   a filtering circuit operably connected to the receiver;
   wherein the modulator is configured to accept as inputs thereto an analog signal and a first digital signal having a first frequency, and the modulator is further configured to modulate the analog signal according to the first frequency and corresponding logic state of the first digital signal to form a frequency-modulated (FM) signal as an output therefrom to the transmitter, the transmitter being configured to encode and transmit the FM signal to the isolator for conveyance thereacross to the receiver as an input thereto, the receiver providing the received FM signal to the frequency discriminator and the filtering circuit, the frequency discriminator being configured to decode the FM signal and provide a reconstructed first digital signal as an output therefrom, the filtering circuit being configured to filter the FM signal and provide the analog signal as an output therefrom.

2. The system of claim 1, wherein the first digital input signal is a first fault signal.

3. The system of claim 1, wherein a second digital signal has a second frequency, and the modulator is further configured to modulate the analog signal according to: (a) the first frequency and corresponding logic state of the first digital signal, and (b) the second frequency and corresponding logic state of the second digital signal, to form the frequency-modulated (FM) signal.

4. The system of claim 3, wherein the frequency discriminator is further configured to decode the FM signal and provide a reconstructed second digital signal.

5. The system of claim 3, wherein the second digital input signal is a second fault signal.

6. The system of claim 1 or claim 3, wherein the filtering circuit comprises a bandpass filtering circuit.

7. The system of claim 6, wherein the passband of the bandpass filtering circuit does not include the first or second frequencies.

8. The system of claim 1, wherein the isolator is one of a capacitive isolator, an optical isolator, and a magnetic isolator.

9. The system of claim 1, wherein the modulator further comprises a triangle wave generator circuit configured to generate and provide as outputs therefrom at least first and second triangle wave signals having the first and second frequencies, respectively.

10. The system of claim 9, wherein the modulator further comprises a comparator having as inputs thereto the triangle wave signals and the analog signal.

11. The system of claim 9, wherein the triangle wave generator circuit is further configured to accept as an input thereto the first digital signal, the first digital signal being a control signal configured to determine whether the output of the triangle wave generator circuit is a triangle signal having the first frequency or the second frequency.

12. The system of claim 1, wherein the filtering circuit further comprises a charge pump circuit having switches that open and close according to the frequency of the received FM signal.

13. The system of claim 1, wherein the filtering circuit further comprises a charge pump circuit configured to provide current that varies in accordance with the frequency of the FM signal received thereby.

14. A solid state lighting system, comprising:
   an AC/DC rectification circuit operably connectable to a source of AC voltage as an input thereto, and configured to provide a rectified DC output voltage;
   an isolation transformer comprising a switched mode power supply (SMPS) controller, the transformer being configured to receive the rectified DC output voltage as an input thereto and to provide an isolated DC output voltage therefrom;
   a lighting circuit comprising at least first and second pluralities of LEDs connected in series and driven by the isolated DC output voltage, a current sensing circuit being operably connected to a current sensing node in the lighting circuit and configured to provide a sensed current signal as an output therefrom;
   a voltage sensing circuit arranged in parallel with respect to the lighting circuit and comprising a voltage sensing node disposed between first and second resistors of a voltage dividing network, the voltage monitoring circuit being configured to provide a voltage monitoring signal as an output therefrom through the voltage sensing node;
   a first comparator configured to receive as inputs thereto the voltage monitoring signal and a first reference voltage, the first comparator being configured to generate a fault state output signal when the voltage monitoring signal exceeds or falls below a predetermined threshold;
   a triangle wave generator circuit having as an input thereto the output signal of the first comparator, the triangle wave generator being configured to generate a triangle wave output signal having a first frequency when an output signal corresponding to the fault state is not received thereby, and a triangle wave signal having a second frequency when the fault state output signal is received thereby;
   a second comparator configured to receive as inputs thereto the triangle wave output signal and the sensed current signal, the second comparator being configured to generate a modulated output signal comprising the sensed current signal and the triangle wave output signal, and
   an optical isolator circuit configured to receive as an input thereto the modulated output signal, the isolator comprising an LED driver operably connected to the output of second comparator, the LED driver providing optical output signals, the isolator further comprising a photodetector configured to generate current in response to the LED driver providing the optical output signals thereto.

15. The system of claim 14, further comprising a transimpedance amplifier configured to receive the current from the photodetector and generate a voltage signal at an output thereof.

16. The system of claim 14, wherein the second comparator is further configured to generate at the output thereof a first pulse-width-modulated (PWM) output signal having a first frequency representative of the sensed current and a second PWM output signal having a second frequency representative of the fault state.

17. The system of claim 14, further comprising a third comparator having as inputs thereto the output voltage signal generated by the transimpedance amplifier and a second reference voltage, the third comparator being configured to generate a charge pump circuit control signal.

18. The system of claim 17, wherein the third comparator further provides a complementary charge pump circuit control signal as an output therefrom.

19. The system of claim 17, wherein the charge pump circuit control signal is provided as an input to a charge pump circuit configured to provide as an output therefrom a reconstructed current sensing signal.

20. The system of claim 19, wherein the reconstructed current sensing signal is provided by the charge pump circuit to the SMPS controller by a linear feedback line.

21. The system of claim 19, wherein the SMPS controller is configured to change the isolated DC output voltage corresponding thereto in accordance with variations in the reconstructed current sensing signal.

22. The solid state lighting system of claim 17, wherein the third comparator is further configured to generate a frequency detection signal.

23. The solid state lighting system of claim 22, wherein the frequency detection signal is provided as an input to a frequency detection circuit.

24. The system of claim 23, wherein the reconstructed fault state output signal is provided by the frequency detection circuit to the SMPS controller by a digital fault signal line.

25. The system of claim 24, wherein the SMPS controller is configured to shut the isolation transformer down in response to receiving the fault state output signal.

26. A DC/DC converter feedback regulation control system, comprising:

A DC/DC converter configured to receive a first DC input voltage and to provide a regulated second DC output voltage;

an isolation transformer comprising a switched mode power supply (SMPS) controller, the transformer being configured to receive the second DC voltage as an input thereto and to provide an isolated DC output voltage therefrom;

a load circuit driven by the isolated DC output voltage, a current fault generation circuit being operably connected to a current sensing node in the load circuit and configured to provide a current fault signal as an output therefrom through the current sensing node when the sensed current falls below or exceeds a first predetermined threshold;

a voltage sensing circuit arranged in parallel with respect to the load circuit and comprising voltage sensing and feedback nodes disposed between first and second resistors of a voltage dividing network, the voltage monitoring circuit being configured to provide voltage monitoring and feedback signals as outputs therefrom through the voltage sensing and feedback nodes, respectively;

a first comparator configured to receive as inputs thereto the voltage monitoring signal and a first reference voltage, the first comparator being configured to generate a voltage fault state output signal when the voltage monitoring signal exceeds a predetermined threshold;

a triangle wave generator circuit having as inputs thereto the output signal of the first comparator and the current sensing node, the triangle wave generator being configured to generate a triangle wave output signal having a first frequency when an output signal corresponding to no voltage or current fault state is received thereby, a triangle wave signal having a second frequency when the voltage fault state output signal is received thereby, and a triangle wave signal having a third frequency when the current fault state output signal is received thereby;

a second comparator configured to receive as inputs thereto the triangle wave output signal and the voltage feedback signal, the second comparator being configured to generate a modulated output signal comprising the triangle wave output signal and the voltage feedback signal, and an optical isolator circuit configured to receive as an input thereto the modulated output signal, the isolator comprising an LED driver operably connected to the output of second comparator, the LED driver providing optical output signals, the isolator further comprising a photodetector configured to generate current in response to the LED driver providing the optical output signals thereto.

27. The system of claim 26, wherein the current fault generation circuit is configured to detect an over current load condition in a gate driving circuit.

28. The system of claim 26, further comprising a transimpedance amplifier configured to receive the current from the photodetector and generate a voltage signal at an output thereof.

29. The system of claim 26, further comprising a third comparator having as inputs thereto the output voltage signal generated by the transimpedance amplifier and a second reference voltage, the third comparator being configured to generate a charge pump circuit control signal.

30. The system of claim 29, wherein the third comparator further provides a complementary charge pump circuit control signal as an output therefrom.

31. The system of claim 29, further comprising a charge pump circuit configured to receive the charge pump circuit control signal and provide as an output therefrom a reconstructed voltage feedback signal.

32. The system of claim 31, wherein the reconstructed voltage feedback signal is provided by the charge pump circuit to the SMPS controller by a linear feedback line.

33. The system of claim 32, wherein the third comparator is further configured to generate a frequency detection signal.

34. The system of claim 32, wherein the frequency detection signal is provided as an input to a frequency detection circuit.

35. The system of claim 34, wherein the reconstructed voltage fault state output signal is provided by the frequency detection circuit to the SMPS controller by a first digital fault signal line.

36. The system of claim 34, wherein the reconstructed current fault state output signal is provided by the frequency detection circuit to the SMPS controller by a second digital fault signal line.

37. The system of claim 33, wherein the SMPS controller is configured to shut the isolation transformer down in response to receiving the current fault state output signal or the voltage fault state output signal.

38. The system of claim 33, wherein the SMPS controller is configured to change the isolated DC output voltage corresponding thereto in accordance with variations in the reconstructed voltage feedback signal.

* * * * *